United States Patent [19]

Minuto

[11] Patent Number: 5,020,397

[45] Date of Patent: Jun. 4, 1991

[54] WRENCH

[76] Inventor: Paul G. Minuto, 66 Mount Pleasant, P.O. Box 1004, Hudson, Quebec, Canada, J0P 1H0

[21] Appl. No.: 429,468

[22] Filed: Oct. 16, 1989

Related U.S. Application Data

[63] Continuation of Ser. No. 309,987, Feb. 13, 1989, abandoned, which is a continuation of Ser. No. 184,987, Apr. 22, 1988, abandoned.

[51] Int. Cl.$^5$ ............................................. B25B 13/00
[52] U.S. Cl. .................................. 81/58.1; 81/177.5; 81/177.2
[58] Field of Search ................. 81/58.1, 177.2, 177.5, 81/124.4, 124.7; 7/100

[56] References Cited

U.S. PATENT DOCUMENTS

| 151,315 | 5/1874 | Rowe | 81/58.1 |
|---|---|---|---|
| 2,382,291 | 8/1945 | Carlberg | 81/177.2 X |
| 2,592,978 | 4/1952 | Trimboli | 81/177.2 X |
| 2,621,688 | 12/1952 | Wales | 81/58.1 X |
| 2,641,291 | 6/1953 | Yess | 81/177.5 X |
| 3,572,188 | 3/1971 | Christian | 81/58.1 X |
| 3,813,967 | 6/1974 | DeHaven | 81/177.2 X |
| 4,691,599 | 9/1987 | Schultz | 7/100 X |

FOREIGN PATENT DOCUMENTS

| 662028 | 10/1928 | France | 81/58.1 |
|---|---|---|---|
| 2057943 | 4/1981 | United Kingdom | 81/58.1 |

*Primary Examiner*—James G. Smith
*Attorney, Agent, or Firm*—Arnold, White & Durkee

[57] ABSTRACT

Disclosed is a wrench for which nuts and the like comprise a hub having a bore therethrough with first handle defined by or associated with the hub for providing torque to the hub. A rotatable shaft has a portion within the bore with fastener drive means connected to one end of the shaft and second handle means connected to the other end thereof. The shaft and hub have complementary engaging socket elements whereby the shaft may be selectively engaged to the hub for rotation therewith by the first handle to develop a first torque or disengaged from the hub for rotation relative to the hub by the second handle to develop a lesser second torque. There is a flange between the complementary engaging socket elements and a socket element to which a nut wrench socket is detachably connected. A plastic shield surrounds the hub and it has a skirt with detent protrusions which cooperate with the flange to positively locate the shaft relative to the hub during use. Further there is an auxiliary handle which is adapted to detachably cooperate with a stub on the hub in order to provide a dual handle operation for developing the first torque leverage.

10 Claims, 2 Drawing Sheets

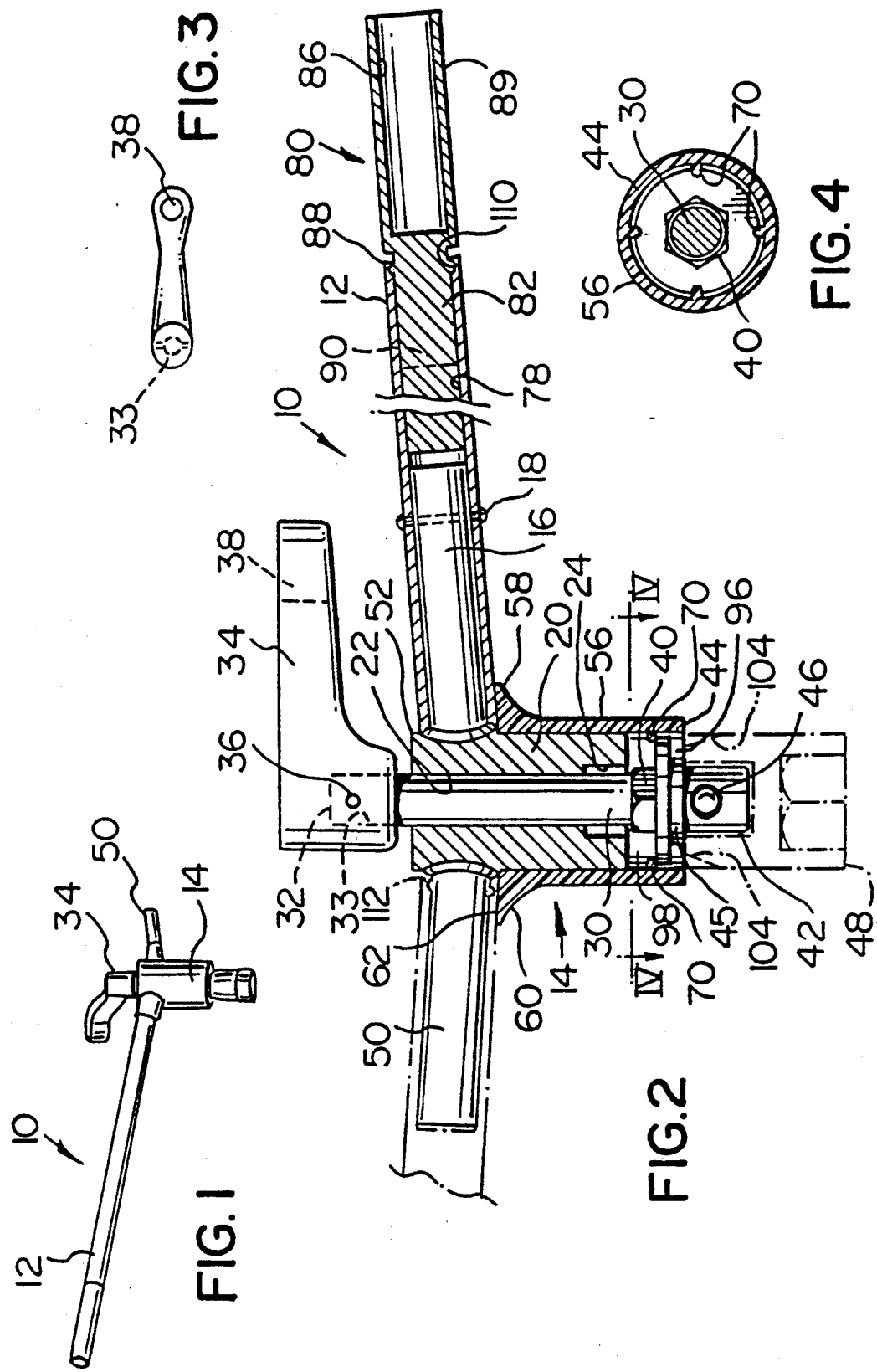

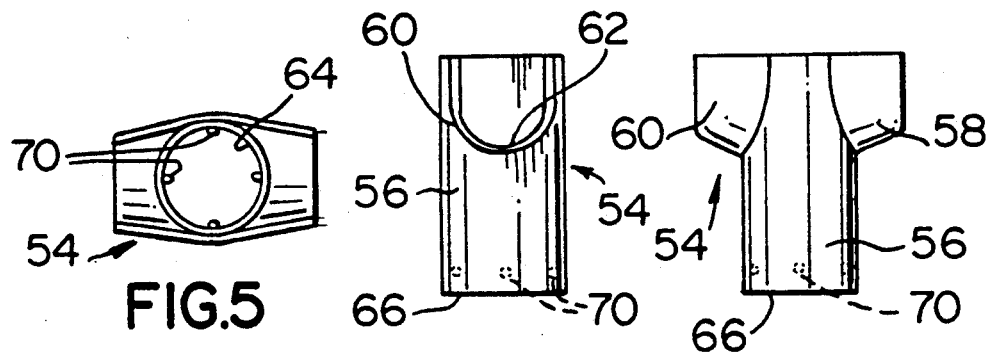
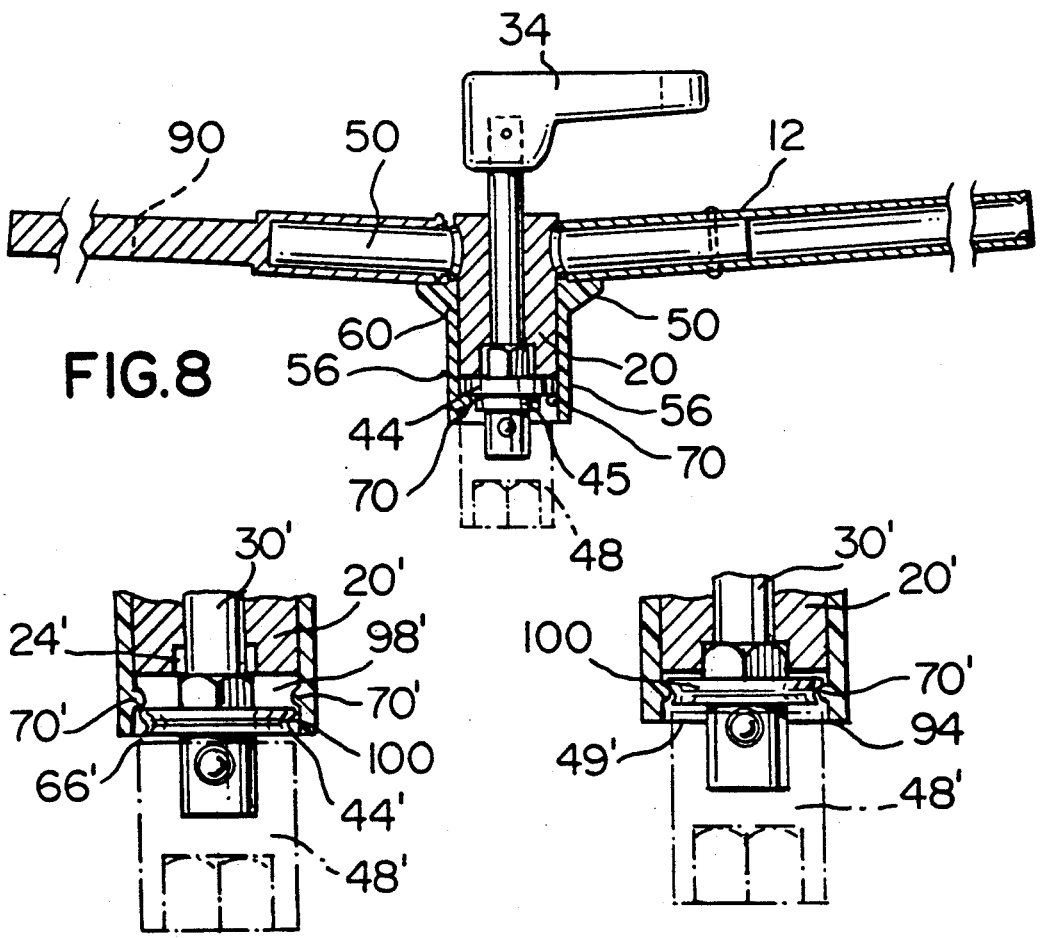

WRENCH

This is a continuation-in-part of U.S. Ser. No. 07/309,987, field on Feb. 13, 1989, now abandoned, which is a continuation of U.S. Ser. No. 07/184,987, field Apr. 22, 1988, now abandoned.

FIELD OF THE INVENTION

The invention relates to a wrench and more particularly to a wrench which has means which selectively permits significant leverage torque to be applied to a fastener such as a nut or permits less force to be so applied for freer rotation of the fastener as circumstances dictate.

BACKGROUND OF THE INVENTION

Socket wrenches have been known for many years and a particular form of socket wrench is that commonly found as an accessory to automobiles to loosen and tighten wheel nuts when the operator is changing a tire. Wheel nuts require a significant force both to loosen and properly tighten and to provide for the necessary torque, the wrench usually has a long handle, often so long that it is difficult to rotate the wrench 360 since the end of the handle invariably hits the ground. Frequently when a nut is loosened by the wrench, the user removes the wrench only to find that the force needed to further turn the nut is too great for the fingers. The wrench must then be used to further turn the nut until it is sufficiently loose so that it can be removed using the fingers. This problem is of course, compounded with those wheel nuts located at the bottom of the wheel where the clearance with ground is less.

Although ratchet type of socket wrenches are known, they are relatively expensive and in most cases rely on some friction between the nut and bolt or lug in order for the ratchet mechanism to work. Often that friction may be greater than what fingers are capable of overcoming.

Accordingly, there developed a need for a wrench which has the capability of handling the requirement of significant leverage operation to loosen or tighten nuts or the like but which also has a free spin or wheeling capability whereby the loosened nut may be positively but relatively easily rotated by means other than the fingers directly on the nut.

Devices which are directed towards the above object are shown in U.S. Pat. No. 151,315, May 26, 1874 to Rowe; French patent 662,028, Mar. 1929 to Mougeotte; U.S. Pat. No. 2,621,688, Dec. 16, 1952 to Wales and British patent publication 2,057,943 A, published Apr. 1981 to Giacchero et al.

The Canadian patent to Rowe relates to carriage wrenches wherein there is an elongate lever having an end surrounding and adapted for detachable connection with the stem of nut socket. A knob on the end of the stem can be used to freewheel the socket when detached from the stem or to maintain it in cooperative connection with the lever end.

The French patent to Mougeotte relates to a socket wrench for automobiles and also has an elongate lever connected to a hub having ratchet means which selectively cooperates with ratchet means on a stem portion of a socket. The stem portion of the socket is connected to a small crank handle by a shaft through the hub and is selectively rotatably and axially slidable relative to the hub.

The U.S. patent to Wales relates to a lever arm screwdriver and wrench wherein a freewheeling knob is associated with a shaft connected to a specifically configured driver tool. A stem connected to the lever arm and through which the shaft extends, has a recess of complementary configuration to that of the driver tool. A detent in the lever stem of the spring biased ball type cooperates with a groove on the shaft.

The British patent publication to Giacchero et al discloses a spanner for nuts and bolts having an operating lever with a handle at one end and a transverse sleeve at the other in which there is rotatably and axially slidably mounted a shaft. The opposite ends of the shaft respectively carry a removable socket usable for turning nuts and a freewheeling operating handle. The sleeve and shaft carry coupling means for selectively coupling the shaft to the sleeve. There is provided a spring-biased ball detent mechanism cooperating with grooves in the shaft and the sheath of plastic surrounding the sleeve provides protection to the sleeve and means through which markings or words may be stamped or written.

Other than the device of Rowe which does not provide any detent mechanism, the detent mechanisms of Wales and Giacchero et al require special making of grooves on the shaft and of holes in the hub for the spring and ball system. Additionally the spring and ball add to the cost of production of the device and may, as in the case of the Giacchero et al device, require a plug to maintain them in operative position. The spring-biased ratchet system of the Mougeotte device requires special machining of the ratchet teeth and assembly with a spring.

Accordingly there appears a need to provide a wrench having a high leverage capability and a low leverage, freewheeling capability which is simple to manufacture without extensive machining, is easy to assembly and yet provides a detent mechanism which is positive in actuation.

SUMMARY OF THE INVENTION

Thus the invention comprehends a tool in the form of a wrench which is capable of a two mode operation, one wherein a first level of torque or leverage may be applied through fastener drive means to nut or screw to be loosened or tightened and another wherein the fastening drive means may be spun more freely with a different torque or leverage.

More particularly, the invention pertains to a wrench comprising a hub having a bore therethrough with means associated with the hub means defining a first handle means. A rotatable shaft has a portion within the bore with fastener drive means connected to one end thereof and second handle means connected to the other end thereof. The shaft and hub have complementary engaging means whereby the shaft may be selectively placed in a first position, engaged to the hub for rotation with the hub by the first handle means and development of a first torque or placed in a second position, disengaged from the hub for rotation relative to the hub by the second handle means and development of a second torque.

The free end of the shaft extends outwardly of the hub and is adapted to detachable securement with a working tool such as a socket device. The shaft has detent means located between the free end and the complementary engaging means which cooperates with detent means of a shield extending axially of the hub.

Cooperation between the shield and the detent means positively locates the shaft in one of said selected positions.

Preferably the detent means on the shaft includes a flange and the shield has inwardly extending protrusions which cooperate with the flange to positively locate the wrench in its different positions.

Accordingly, the invention in one broad aspect pertains to a wrench comprising a hub means having a bore therethrough with means secured to the hub means defining a first elongate handle means. Shaft means has a portion within the bore, with fastener drive means connected to one end thereof and second handle means connected to the other end thereof, the shaft means being adapted for rotation and axial movement relative to the hub means. The shaft means and hub means having complementary engaging means, whereby the shaft means may be selectively engaged to the hub means in a first position for rotation therewith by the first handle means to develop a first torque, or a second position disengaged from the hub means for rotation relative to the hub means by the second handle means to develop a second lesser torque. Shield means for the hub has a skirt extending axially in the direction of the fastener drive means, the shaft means and skirt having cooperating detent means for positively locating shaft means relative to said hub means in the first or second positions.

Other aspects of the invention will become apparent from a review of the description herein of a preferred embodiment of the invention.

BRIEF DESCRIPTION OF THE DRAWINGS

FIG. 1 is a perspective view of the novel wrench.

FIG. 2 is an elevational view, partially in section, of the wrench in the freewheeling mode.

FIG. 3 is a top view of the handle.

FIG. 4 is a sectional view along line 4—4 of FIG. 2.

FIG. 5 is a top view of the shield for the hub of the wrench.

FIG. 6 is an end elevational view of the shield.

FIG. 7 is a side elevational view of the shield.

FIG. 8 is a side elevational view, partially in section, like FIG. 2 but showing the auxiliary lever arm in place and the socket portion engaged for the leverage mode of operation.

FIG. 9 is an elevational sectional view of part of the wrench showing a modification of the wrench in its freewheeling mode.

FIG. 10 is an elevational sectional view of the modified wrench of FIG. 9 showing the wrench in its leverage mode of operation.

DESCRIPTION OF THE PREFERRED EMBODIMENTS

Turning to the drawings, FIGS. 1 and 2 show a wrench 10 having an elongated cylindrical (first) handle 12 and head or hub 14, hub 14 having integral cylindrical protrusion 16 (FIG. 2) which is received within one end of handle portion 12 and secured thereto by through rivet means 18. Alternatively a simple press or interference fit between protrusion 16 and handle 12 is appropriate. Although not necessary, protrusion 16 is preferably at an angle slightly greater than 90° to the axis of hub 14.

Hub 14 includes main cylindrical portion 20 having an axial through bore 22 with an enlarged female socket (hexagonal) opening 24 coaxial therewith.

Within bore 22 is rotatable and axially slidable cylindrical shank 30 having one end 32 attached within bore 33 of winged (or second) handle 34 through rivet fastening means 36. Handle 34 is preferably of molded plastic and has opening 38 at its distal end which opening is of a size to accommodate the index finger of the ordinary user for reasons set out further herein. The other end of shank 30 has male socket element 40 (hexagonal) integral therewith. Socket element 42 (square) is integral with but separated from male socket element 40 by flange 44 having stop surface portion 45. Socket element 42 has the usual spring biased ball means 46 for detachably securing a known nut socket (dotted lines 48) to element 42. Male socket element 40 has a configuration complementary to that of female socket opening 24. Shank 30 is adapted to rotate and axially slide or translate within bore 22.

Extending outwardly from hub 20 and diametrically opposite protrusion or stub 16 is cylindrical auxiliary handle protrusion or stub 50 of similar size and configuration to protrusion 16 both of which may be welded at 52 or otherwise fixedly associated with hub 20.

Plastic molded shield 54 (FIGS. 2, 5, 6 and 7) has cylindrical portion 56 adapted to surround cylindrical hub portion 20 and has lateral arm portions 58 and 60 at one end, lateral arm portion 58 being adapted to surround the lower part of handle 12 adjacent to hub portion 20 (FIG. 2). Shield arm portion 60 is similarly configured as portion 58 but the inside arcuate portion 62 adjacent the junction with cylindrical portion 56 is spaced from stub 50 for reasons noted hereinafter.

Shield 54 is shown separately in FIGS. 5–7 as viewed from the top, in end elevation and in side elevation respectively. Cylindrical portion 56 has internal surface 64 which has a diametric size relative to that of hub 20 so that shield portion 54 can tightly friction fit hub cylindrical portion 20.

Extending inwardly from surface 64 adjacent skirt end opening 66 is a plurality of circular, rounded end, detents, knobs or protrusions 70 (four being shown) which protrusions are integrally molded with cylindrical portion 56. The axial length of shield 54 and the axial location of detents or protrusions 70 are selected for purposes detailed more fully herein.

Turning to FIGS. 2 and 8, handle 12 comprises a hollow rod with interior surface 78 secured to stub 16 as noted previously. An auxiliary handle 80 is normally located in association with handle 12, handle 80 having cylindrical shank 82 adapted to telescope within handle 12 and outer cylindrical end 84. End 84 has bore 86 which is adapted to telescope over stub 50 and cooperates with shield portion 60 as detailed further herein. The end of shank 82 adjacent cylindrical end 84 has small detent ribs 88 which friction fit with the inner surface 78 of handle 12.

In use, assuming wrench 10 is primarily for use with tire nuts (not shown), winged handle 34 is pulled out relative hub 20 as shown in FIG. 8 and a socket 48 is attached to element 42. Male socket element 40 is located within female socket opening 24 with flange 44 behind detents 70 of shield 60. Detents 70 in cooperation with flange 44 assist in maintaining engagement of male socket element 40 and female socket 24. In this position, handle 12 provides a suitable leverage mechanism to loosen a nut (not shown) with which socket 48 is connected.

Once the nut (not shown) is loosened, relative axial movement inwardly between handle 34 and hub portion 20 causes shaft 30 and socket element 40 to move axially whereby male socket element 40 assumes a position shown in FIG. 2 disengaged from female socket opening 24. Handle 34 may be freely rotated to cause further loosening and final removal of the nut. If desired, this freewheeling of handle 34 may be achieved by inserting an index finger in opening 38. When the relative position of handle 34 and hub portion 20 is as shown in FIG. 2, flange 42 moves axially outwardly past detents 70 of shield 54 and this cooperation assists in maintaining disengagement of male socket element 40 from female socket 24.

If, when the wrench is in its high leverage condition as shown in FIG. 8 and additional leverage is desired, auxiliary handle 80 may be extended from handle 12 for part of its length. Accordingly, slight extension of handle 80 relative handle 12 allows greater torque to be exerted in levering a nut or the like with one arm or handle means. Although only shown in dotted lines at 90 in FIGS. 2 and 8, it will be appreciated that a line demarcation or the like on shank portion 82 can be made which would indicate a safe limit of the extension of handle 80 relative to handle 12 when associated together as shown in FIG. 2. However, auxiliary handle 80, which has solid shank section 82 and cylindrical bore end section 84 can be removed from handle 12 and bore 86 of end portion 84 is axially moved onto auxiliary stub 50. End portion 84 is slipped through the gap 63 between the bottom of stub 50 and shield portion 60 with shield portion 60 flexing slightly. The fit between end section 84 and the surface 62 of shield arm portion 60 is such as to assist in frictionally maintaining handle 80 associated with stub 50. When handle 80 is located as shown in FIG. 8, the wrench has a two handle capability to further assist in removing difficult nuts or the like.

It will be seen from FIGS. 2 and 8 that the skirt end at opening 66 of cylindrical shield portion 56 extends sufficiently to cover the gap 96 between nut socket 48 and flange 44 (FIG. 2), as well as covering the space 98 between flange 44 and hub 20. Thus this construction eliminates the possibility of pinching the hand or fingers when moving shaft 30 between its two positions. When in the position shown in FIG. 8, the shield skirt adjacent opening 66 surrounds the upper part of nut socket 48.

It will be appreciated that various modifications of the wrench are possible. By way of example, complementary socket opening 24 and socket element 40 may be square rather than hexagonal and could be located at the handle 34 end of hub 20 with appropriate means in such case provided for assembling of the shank 30 to hub portion 20.

A further modification is shown in FIGS. 9 and 10 wherein flange 44' is slightly thicker and has a periphery groove 100 adapted to cooperate with shield protrusions 70'. This permits the use of flange 44' as the stop surface for socket 48' and eliminates the need for stop surface 45 shown in FIGS. 2 and 8. Further, in this embodiment, the shield skirt adjacent opening 66' extends so as to cover the space 98' between the hub 20' and flange 44' but since there is no gap between the flange 44' and socket 40', it need not extend further than to provide proper support for protrusions or detents 70'.

In addition, if the socket 48 has a tapered end profile as shown in dotted lines in FIG. 2 at 104, stop surface 45 to define space 96 is not required as the tapered end profile of socket 48 will permit appropriate location of protrusions 70 behind flange 44.

Further it will be appreciated that the shape of the detents 70 may be varied and could include a circumferential ring or parts thereof rather than button-like protrusions.

Still further, it will be apparent that detent means may be used to positively hold handle portions 12 and 80 together such as shown at 110 in FIG. 2 as well as detent means between bore 86 and stub 50 shown at 112 in FIG. 2.

Accordingly, there is provided a simplified wrench which is easily manufactured, the hub 20 and stubs 16 and 50 out of steel for example with shield 60 and handle 34 of suitable molded plastic material such as polypropylene. Other plastics which may be heat shrunk onto hub 20 are contemplated for shield 60. Further, handles 12 and 80 may be made of steel or suitable strengthened fiberglass in accordance with known techniques. The simple cooperation between the flange 44 and detent means 70 on the shield facilitates ease of fabrication and assembly of the wrench.

Other modifications will be apparent to those skilled in the art and I seek to include all those obvious modifications which fall within the ambit and scope of the appended claims.

The embodiments of the invention in which an exclusive property or privilege is claimed are defined as follows:

1. A wrench comprising:
   hub means having a bore therethrough;
   means secured to said hub means defining a first elongate handle means;
   shaft means having a portion within said bore, said shaft means having fastener drive means connected to one end thereof and second handle means connected to the other end thereof, said shaft means being adapted for rotation and axial movement relative to said hub means;
   said shaft means and hub means having complementary engaging means, whereby said shaft means may be selectively engaged to said hub means in a first position for rotation therewith by said first handle means to develop a first torque, or a second position disengaged from said hub means for rotation relative to said hub means by said second handle means to develop a second lesser torque;
   shield means secured to said hub means and having a skirt extending axially in the direction of said fastener drive means, said shaft means and skirt having cooperating detent means outside said hub means for positively locating said shaft means relative to said hub means in said first or second positions.

2. The wrench tool according to claim 1 wherein said complementary engaging means comprises a socket opening adjacent one end of said bore and a complementarily shaped socket element connected to said shaft means and adjacent said fastener drive means, whereby selective axial movement of said shaft means relative said bore engages or disengages said socket element with said socket opening.

3. The wrench tool according to claim 1 wherein said first elongated handle means comprises an elongated bar secured to a protrusion integral with and extending from said hub means adjacent to end of said hub distant from said socket opening.

4. The wrench according to claim 3 wherein said second handle means comprises a handle element secured to the other end of said shaft means and having a finger rotating aperture therein.

5. The wrench according to claim 1 wherein said cooperating detent means comprises a flange on said shaft means axially inwardly from said fastener drive means and at least one inwardly directed protrusion of the skirt of said shield means.

6. The wrench according to claim 5 wherein the location of said flange on either side of said at least one skirt protrusion defines said first and second positions.

7. The wrench according to claim 5 wherein said flange has a peripheral groove adapted to cooperate with said at least one skirt protrusion to define one of said positions.

8. The wrench according to claim 1 including stub means secured to said hub diametrically opposite said first handle means, and auxiliary handle means adapted to be selectively connected with said stub means whereby additional tongue leverage is provided by said first handle and said auxiliary handle means.

9. The wrench according to claim 8 wherein said auxiliary handle means and first handle means are constructed whereby at least a part of said auxiliary handle means is adapted to be stored within said first handle means.

10. A wrench comprising:

hub means having a bore therethrough;

means secured to said hub means defining a first elongate handle means;

shaft means having a portion within said bore, said shaft means having fastener drive means connected to one end thereof and second handle means connected to the other end thereof, said shaft means being adapted for rotation and axial movement relative to said hub means;

said shaft means and hub means having complementary engaging means, whereby said shaft means may be selectively engaged to said hub means in a first position for rotation therewith by said first handle means to develop a first torque, or a second position disengaged from said hub means for rotation relative to said hub means by said second handle means to develop a second lesser torque;

shield means for said hub having a skirt extending axially in the direction of said fastener drive means, said shaft means and skirt having cooperating detent means for positively locating said shaft means relative to said hub means in said first or second positions;

stub means secured to said hub diametrically opposite said first handle means, and auxiliary handle means adapted to be selectively connected with said stub means whereby additional tongue leverage is provided by said first handle and said auxiliary handle means;

said auxiliary handle means and first handle means being constructed whereby at least a part of said auxiliary handle means is adapted to be stored within said first handle means; and said shield means including an arm portion located closely adjacent to said stub means and constructed to cooperate with a portion of said auxiliary handle means when on said stub means to provide means for retaining said auxiliary handle means thereon.

* * * * *

UNITED STATES PATENT AND TRADEMARK OFFICE
CERTIFICATE OF CORRECTION

PATENT NO. : 5,020,397

DATED : June 4, 1991

INVENTOR(S) : Paul G. Minuto

It is certified that error appears in the above-identified patent and that said Letters Patent is hereby corrected as shown below:

In column 1, line 7, "field" should read --filed--.

In column 1, line 54, "Canadian" should read --U.S.--.

In column 5, line 28, "63" should read --62--.

Signed and Sealed this

Twenty-second Day of June, 1993

Attest:

MICHAEL K. KIRK

Attesting Officer   Acting Commissioner of Patents and Trademarks